United States Patent
Alexander et al.

(10) Patent No.: US 8,533,667 B2
(45) Date of Patent: *Sep. 10, 2013

(54) CALL WIZARD FOR INFORMATION MANAGEMENT SYSTEM (IMS) APPLICATIONS

(75) Inventors: William Alexander, Providence, RI (US); Shyh-Mei F. Ho, San Jose, CA (US); Jenny C. Hung, San Jose, CA (US); Cynthia F. Krauss, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 925 days.

This patent is subject to a terminal disclaimer.

(21) Appl. No.: 12/649,803

(22) Filed: Dec. 30, 2009

(65) Prior Publication Data
US 2011/0161924 A1     Jun. 30, 2011

Related U.S. Application Data

(63) Continuation-in-part of application No. 12/649,775, filed on Dec. 30, 2009, now Pat. No. 8,375,353.

(51) Int. Cl.
*G06F 9/44*    (2006.01)
*G06F 9/45*    (2006.01)
*G05B 13/02*   (2006.01)

(52) U.S. Cl.
USPC ............... 717/109; 703/22; 700/30; 700/31; 717/105

(58) Field of Classification Search
USPC .................................. 717/105, 109
See application file for complete search history.

(56) References Cited

U.S. PATENT DOCUMENTS

| | | | | | |
|---|---|---|---|---|---|
| 5,812,849 | A | * | 9/1998 | Nykiel et al. | 717/101 |
| 6,233,726 | B1 | * | 5/2001 | Bowman et al. | 717/107 |
| 6,324,681 | B1 | * | 11/2001 | Sebesta et al. | 717/102 |
| 6,983,468 | B1 | * | 1/2006 | Green et al. | 703/22 |
| 7,805,713 | B2 | * | 9/2010 | Patel | 717/106 |
| 8,250,531 | B2 | * | 8/2012 | Bolene et al. | 717/120 |

OTHER PUBLICATIONS

Barker et al., "The Benefits of Service Choreography for Data-Intensive Computiing," ACM, 2009, 10pg.*
Kloppmann et al., "Business process choreography in WebSphere: Combining the power of BPEL and J2EE," IBM, 2004, 27pg.*

* cited by examiner

*Primary Examiner* — Li B Zhen
*Assistant Examiner* — Ryan Coyer
(74) *Attorney, Agent, or Firm* — Patents on Demand P.A.; Brian K. Buchheit; Scott M. Garrett (57) ABSTRACT

IMS source code or a graphical object having corresponding IMS source code can be selected within the graphical user interface (GUI). The IMS source code can include a call out to an external application. An IMS call wizard can be invoked, which graphically prompts a user to specify call-out specific conditions for the external application via an ordered series of presented screens. Each screen can present a user with at least one selectable option. User-made selections from earlier ones of the presented screens can change options presented in later ones of the presented screens. IMS code can be generated to call out an external application in accordance with the user selections of the IMS call wizard. The generated IMS code can be inserted into the selected IMS source code. After the insertion, the IMS source code is operable to call out to the external application.

19 Claims, 4 Drawing Sheets

Sample IMS Call Wizard Code 300

```
305   ICAL-SENDRECV.

310       MOVE LENGTH OF AIB TO AIBRLEN.
          MOVE LENGTH OF IN-MSG TO AIBOALEN.
          MOVE LENGTH OF OUT-MSG TO AIBOAUSE.
          MOVE IN-MSG TO ICAL-REQMSG.

315   CALL 'AIBTDLI' USING ICAL, AIB, ICAL-REQMSG,
      ICAL-RESPMSG.

320       IF AIBRETRN NOT EQUAL ZEROES
              MOVE AIBRETRN TO ERR-OUTRETRN
              MOVE AIBREASN TO ERR-OUTREASN
              MOVE AIBERRXT TO ERR-OUTERRXT
              MOVE ICAL-RESPMSG TO OUT-MSG
          ELSE
              MOVE ICAL-RESPMSG TO OUT-MSG.

325   ICAL-SENDRECV-END.
```

CALL WIZARD FOR INFORMATION MANAGEMENT SYSTEM (IMS) APPLICATIONS

BACKGROUND

The disclosure relates to the field of information management system (IMS) applications and, more particularly, to a call wizard for IMS applications.

One software system central to the performance of many business processes is an information management system (IMS). However, use of IMS within a conventional process flow application is prohibitive. Firstly, current process flow generation tools lack the ability to handle function calls and/or data structures that are specific to conventional IMS implementations. This increases the time and cost of using IMS within a process flow application since that such code elements would need to be added manually by application developers.

A current approach to overcome this is to handle the invocation of IMS applications as service components and not as complete service blocks. That is, instead of being able to pass the IMS application a set of input data for it to perform calculations upon and receive a final set of output data, the input and output is exchanged for each step or calculation performed. This increases the quantity of calls required to the IMS application to complete the step of the process flow. Each call to the IMS application requires an independent network request and response, increasing the network overhead and decreasing performance of the process flow application.

Another prohibitive factor is the interaction of IMS applications with external servers and business systems. Programming logic must be manually added to IMS applications in order to ensure proper communication with external servers, which may be running on a different platform. The manual addition of more code is required for the IMS application to support other business systems, such as business logic implementation, event processing, exception handling, and compensation logic. Because of the manual nature of these activities, it would be a costly and time-consuming undertaking for an organization to modify their library of IMS applications.

BRIEF SUMMARY

One aspect of the disclosure is for a method and computer program product for an information management system (IMS) callout wizard, which is visually implemented within a graphical user interface based on processor executed code stored in a tangible storage medium. IMS source code or a graphical object having corresponding IMS source code can be selected within the graphical user interface (GUI). The IMS source code can include a call out to an external application. An IMS call wizard can be invoked, which graphically prompts a user to specify call-out specific conditions for the external application via an ordered series of presented screens. Each screen can present a user with at least one selectable option. User-made selections from earlier ones of the presented screens can change options presented in later ones of the presented screens. IMS code can be generated to call out an external application in accordance with the user selections of the IMS call wizard. The generated IMS code can be inserted into the selected IMS source code. After the insertion, the IMS source code is operable to call out to the external application.

One aspect of the disclosure is for an information management system (IMS) toolset for developing IMS applications executable within an IMS environment. The IMS toolset can include an IMS call wizard having a graphical user interface that presents users with allowable options for call parameters and that generates source code based on the user selections.

One aspect of the disclosure is for an IMS system that includes an IMS call wizard. The IMS call wizard can include a set of sequenced screens presented via a graphical user interface. The sequenced screens can present users with allowable options for call parameters and for automatically generating source code for call outs to applications external to an IMS system from within the IMS system based on user selections made within the sequenced screens. User-made selections from earlier ones of the presented screens can change options presented in later ones of the presented screens.

DETAILED DESCRIPTION

The disclosure provides a call wizard software development tool for information management system (IMS) applications. The call wizard can permit a user to insert external calls (asynchronous events and synchronous callouts) to IMS source code using a call wizard. The call wizard can permit a user to select a type of IMS call that is to be inserted. Interface types can include, for example, an application interface block (AIB), a language-independent interface (call control element or CCE), a language specific interface, and the like. Call-out types can include database management and transaction management types, for example. Once a type of IMS call has been selected, a list of functions available for selection based on the initial choices can be presented. For example, a set of transaction management functions for use in the call can be presented, when a transaction management call type is selected previously. Data language structures for defining request and response message can then be selected from a GUI presented listing of possible structures. Code is then generated and inserted into the IMS source file that performs an IMS call out based on the information selected in the call wizard.

In one embodiment, the call wizard can be part of a graphical assembly tool to visually choreograph and generate information management system process flow applications. In one embodiment, the call wizard can be used with an IMS process flow control program that embodies process flow elements such as business logic and events as well as communication with external non-IMS applications. Both the IMS process flow application and IMS process flow control program can be run within the IMS.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
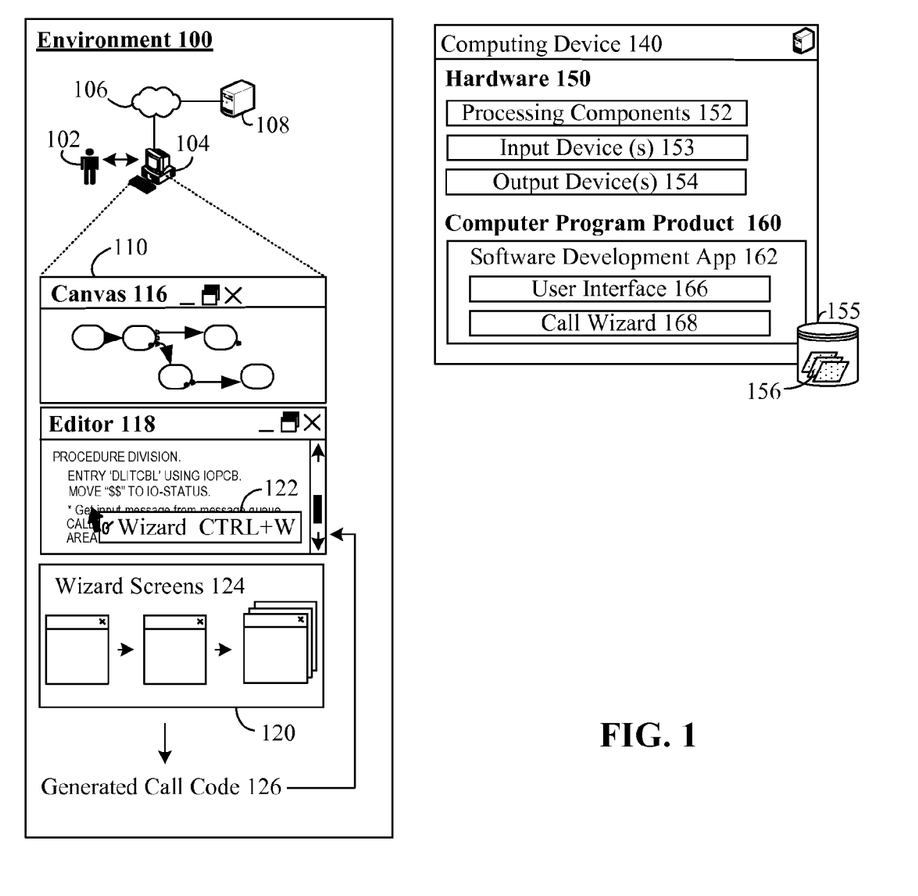
FIG. 1 shows a software development environment having an IMS call wizard in accordance with an embodiment of the disclosure.

FIG. 1 shows a software development environment 100 having graphical user interface 110 that includes a call wizard 120 in accordance with an embodiment of the disclosure. The call wizard 120 can be a user interface 110 enhancement having corresponding call wizard code 168, which is executed upon hardware 150 to produce the functionality of wizard 120 detailed herein. Specifically, the call wizard 120 presents a set of screens 124 through which a user makes selections. Based on these selections, call code 126 is generated, which is inserted into IMS source code. The call code 126 permits external calls (asynchronous events and synchronous callouts) without requiring a developer 102 to enter low-level manual code via a source editor 118.

The canvas 116 can be part of an integrated development environment (IDE), such as an ECLIPSE based IDE. Within the canvas 116, a developer 102 can view, create, and edit objects of an IMS application. For example, the IMS application can be an IMS process flow application, where process flows are created and shown. It should be emphasized that the call wizard 120 can operate with any IMS application.

Canvas 116 and user interface 110 can be associated with implementation code 162, and 166. Once a specific node or other graphical object is selected in a canvas 116, associated source code can be presented in a source code editor 118. In one embodiment, a user can position a cursor at a suitable position of the source code and invoke (selection element 122) the wizard screens 124. The code 126 generated as a result can be inserted at the pointer position of the editor 118. In another embodiment, a user can be trigger the call wizard directly from canvas 116 for a graphically selected object, which results in generated call code 126 being inserted into a suitable location of the source code of the graphically selected canvas 116 object.

The development environment 100 can be implemented in a variety of different ways or configurations. A typical configuration establishes one or more servers 108 that are connected to client computers 104 via a network 106. Developers 102 interact with the client computer 104, which presents the user interface 110 including a graphical canvas 116 for visual development of IMS applications. In one embodiment, client computer 104 can run a Web browser within which user interface 110 is presented. Further, stand-alone implementations are contemplated where a single computing device 104 hosts the software that includes the call wizard 120.

Each of the computing devices 104, 108 of the development environment 100 can include hardware 150 and computer program product 160 components, as shown by device 140. Processing components 152 of the hardware 150 can include one or more microprocessors, memory, a bus, network cards, and the like. Input devices 153 can include a keyboard, mouse, touch screen, joystick, microphones, touch screens, and the like. The output devices 154 can include visual displays, audio speakers, and/or other sensory output devices. Data store 155 can be a tangible storage media accessible by at least one of the devices 104, 108 in environment 100. Data store can include IMS applications 156 or at least source code for IMS applications. Each device 104, 108 can represent a single physical machine or a virtual machine implemented via N number of physical machines (each having hardware 150 components).

Figure 2:
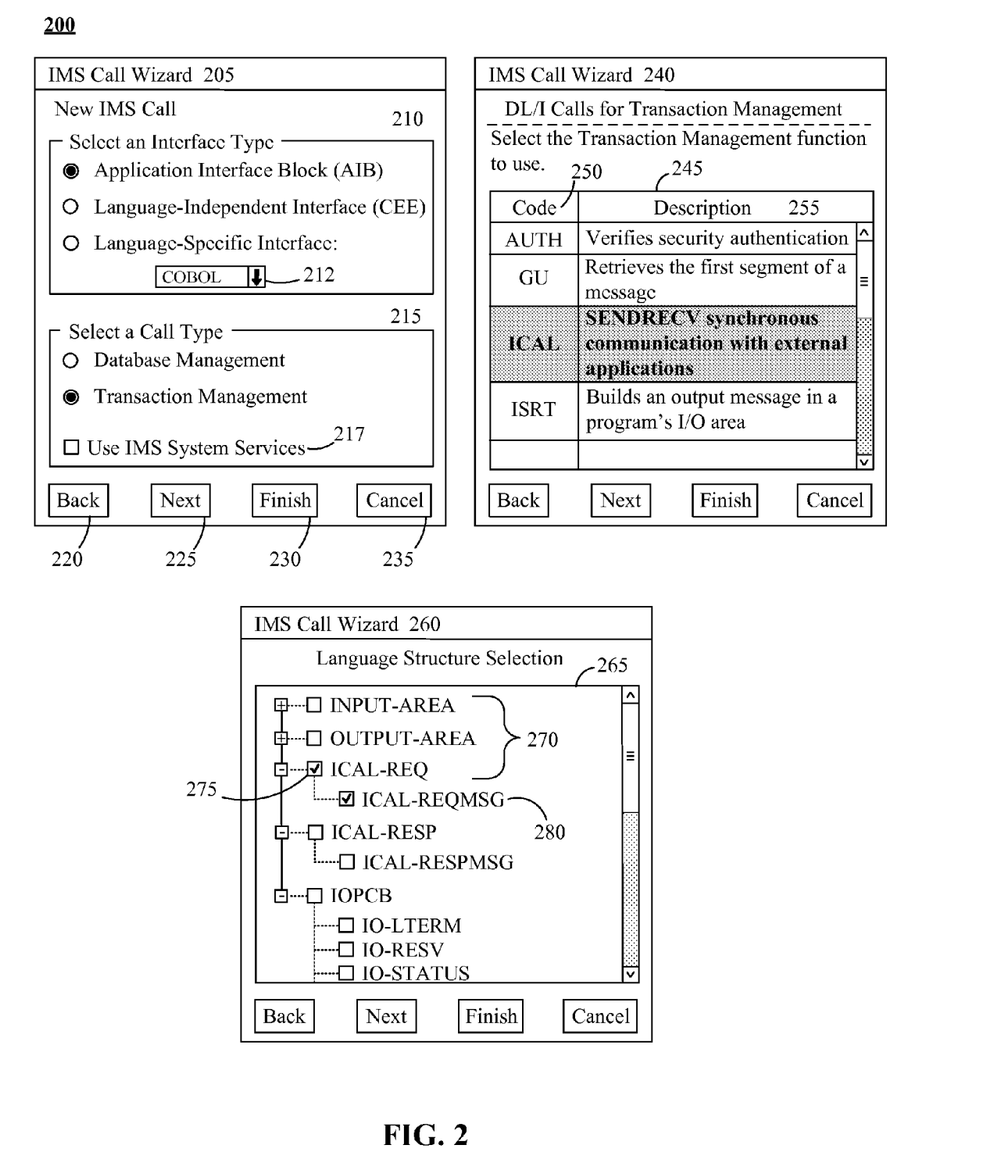
FIG. 2 is a collection of example graphical user interfaces (GUIs) illustrating the IMS call wizard in accordance with an embodiment of the inventive arrangements disclosed herein.

FIG. 2 shows a collection 200 of example graphical user interface (GUI) screens 205, 240, and 260 illustrating an IMS call wizard in accordance with an embodiment of the inventive arrangements disclosed herein. Thus, the collection 200 represents on embodiment of the wizard screens 124 of FIG. 1. The sample screens 205, 240, 260 of FIG. 2 are provided to illustrate functionality of the call wizard. Specifics of these screens are not to be construed as limiting the scope of the disclosure, but are instead provided to illustrate via example a set of concepts presented herein.

Invocation of the IMS call wizard can present the user with GUI 205 to guide the user through the creation of a new IMS call. IMS call wizard GUI 205 can include an interface selection area 210, a call type selection area 215, and a persistent set of control buttons 220-235.

The interface selection area 210 can present the user with selection mechanisms for the types of interfaces supported by the IMS application. As shown in this example, the interface selection area 210 can present user-selectable radio buttons for an application interface block (AIB), a language-independent interface (CEE), and a language-specific interface. The language-specific interface option can include a secondary selection mechanism, such as drop-down menu 212, to allow the user to select the specific programming language.

The call type selection area 215 can allow the user to select between the various call types supported by the IMS application. In this example, the call type selection area 215 can include radio buttons for the selection of a database management call or a transaction management call. The call type selection area 215 can also include a separate option 217 for utilizing the inherent IMS system services for the call type.

The set of control buttons 220-235 can allow the user to navigate through the IMS call wizard. The control buttons can include a BACK button 220, a NEXT button 225, a FINISH button 230, and a CANCEL button 235. The CANCEL button 235 can terminate use of the IMS call wizard by the user, discarding any selections made.

The FINISH button 230 can indicate that the user has made all desired selections and that the IMS call wizard can perform any additional activities to complete generation of the call, such as exception handling and code generation.

The BACK button 220 can allow the user to return to the previous step of the IMS call wizard. Since IMS call wizard GUI 205 is the first step of the IMS call wizard, the BACK button 220 can be disabled or hidden. Disablement of one or more control buttons 220-235 within a GUI 205, 240, and/or 260 can be used as means of restricting inappropriate or incomplete operation of the IMS call wizard.

The NEXT button 225 can allow the user to proceed to the subsequent step of the IMS call wizard. From IMS call wizard GUI 205, the NEXT button 225 can present GUI 240. IMS call wizard GUI 240 can present the user with options for the next step in call definition based upon the selections made in IMS call wizard GUI 205.

In another contemplated embodiment, the control buttons 220-235 can be implemented utilizing alternate and/or additional means, such as right-click menu selections, keyboard commands, selectable graphical elements, and the like.

As shown in this example, IMS call wizard GUI 240 can present the user with a selection area 245 displaying available transaction management functions, since the option for transaction management was selected in the call type selection area 215 of IMS call wizard GUI 205.

In this example, the selection area 245 can utilize a tabular format detailing the code 250 and a description 255 of each transaction management function. The 'ICAL' function has been highlighted to indicate user-selection.

Selection of the BACK button 220 within IMS call wizard GUI 240 can return the user to IMS call wizard GUI 205. Selection of the NEXT button 225 can present the user with IMS call wizard GUI 260.

Based on the function selected in IMS call wizard GUI 240, IMS call wizard GUI 260 can present the user with the various language structures 270 associated with that selection that are available for use as the request message. The list of language structures 270 can be created by parsing the source file open within the IMS-specific source code editor from which the IMS call wizard was launched.

The language structures 270 can be presented within a display area 265, such as the tree format shown in this example. Each language structure 270 can include a selector 275, such as a checkbox, and one or more data fields 280. In this example, the request structure (ICAL-REQ) 270 has been selected and the request message (ICAL-REQMSG) data field 280.

From IMS call wizard GUI 260, the BACK button 220 can return the user to IMS call wizard GUI 240. Selection of the NEXT button 225 can allow the user to proceed to the next GUI (not shown) of the IMS call wizard.

Figure 3:
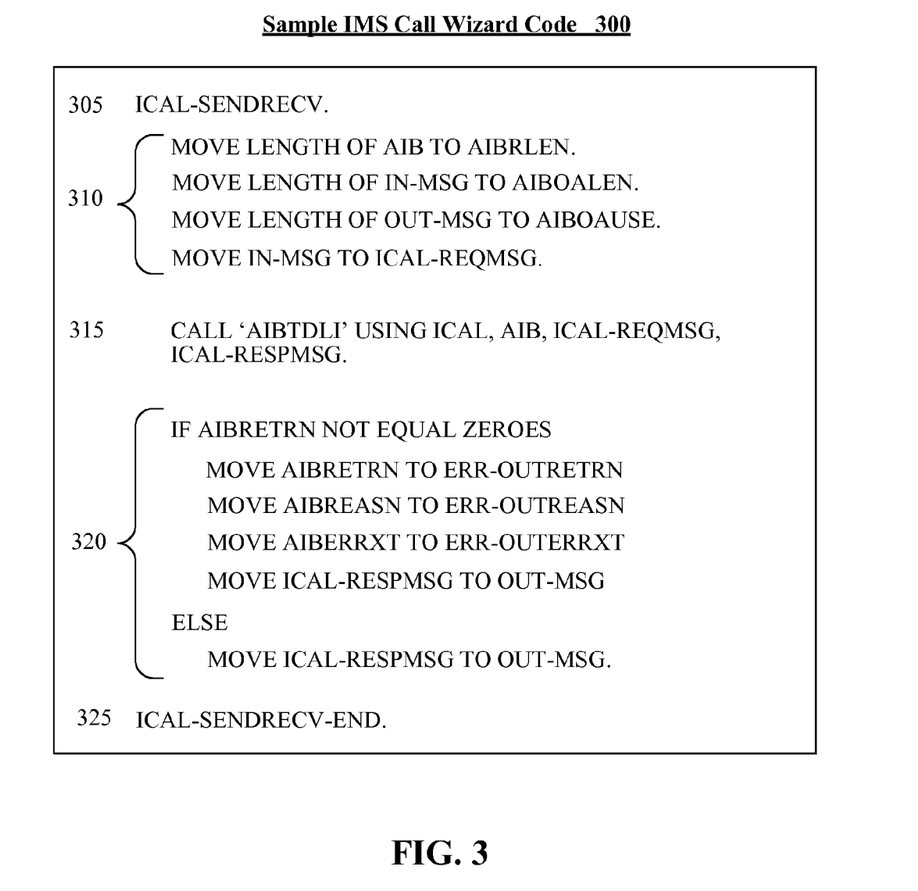
FIG. 3 is an example of sample IMS call wizard code in accordance with an embodiment of the inventive arrangements disclosed herein.

FIG. 3 is an example of sample IMS call wizard code 300 in accordance with an embodiment of the inventive arrangements disclosed herein. The sample IMS call wizard code 300 can be generated within the context of environment 100 and/or utilizing the IMS call wizard GUIs screens 205, 240, and 260 of FIG. 2.

Line 305 can define the start of the call function selected in the IMS call wizard—'ICAL-SENDRECV'. Grouping 310 can represent one or more lines of code that initialize the necessary procedure variables.

Line 315 can represent a call statement for making a synchronous request for data or service from a non-IMS application without using the IMS message queue. This call statement can indicate use of the AIB-to-DLI (AIBTDLI) interface library, the IMS CALL (ICAL) function, ICAL-REQMSG as the request language structure, and ICAL-RESPMSG as the response language structure.

Grouping 320 can represent code for handling errors that can occur during the performance of the call statement 315 based on the value of the return value (AIBRETRN). Regardless of errors with the call statement 315, the contents of the response message returned to the code and/or application that invoked the sample IMS call wizard code 300 can correspond to the contents of the received ICAL-RESPMSG. Line 325 can define the end of the call function.

Figure 4:
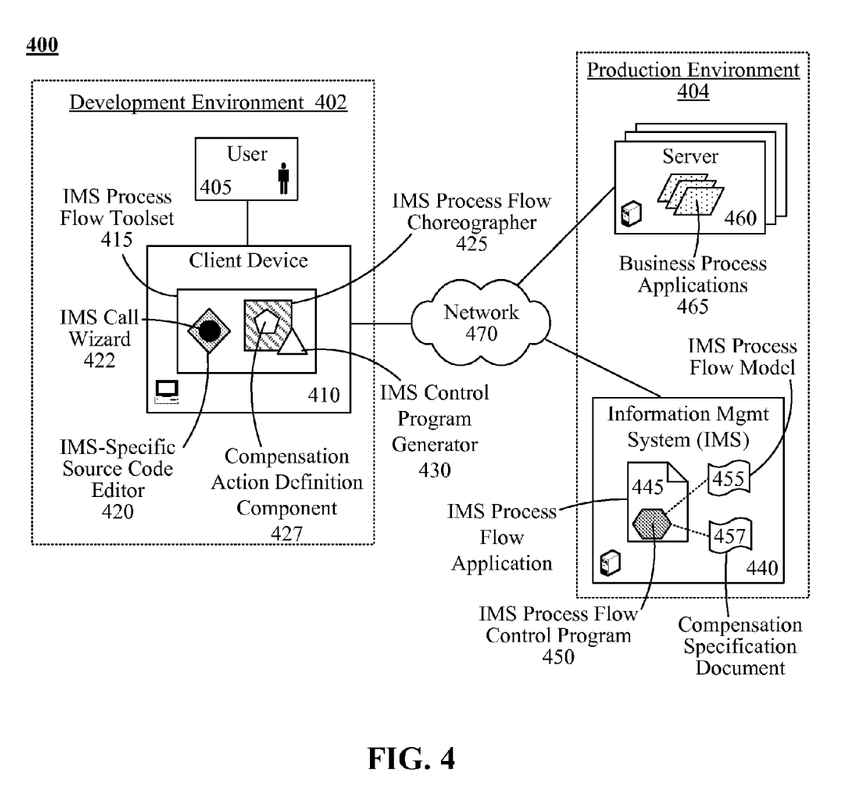
FIG. 4 is a schematic diagram illustrating a system that enables the use of IMS process flow applications within an information management system (IMS) in accordance with embodiments of the inventive arrangements disclosed herein.

FIG. 4 is a schematic diagram illustrating a system 400, which is one non-limiting embodiment for the disclosure. The IMS call wizard 422 of FIG. 4 can be an implementation of wizard 120, 168. System 400 enables the use of IMS process flow applications 445 within an information management system (IMS) 440 in accordance with embodiments of the inventive arrangements disclosed herein. It should be emphasized that the call wizard can be used with any IMS application, and that an IMS process flow application (shown in system 400) is just one contemplated embodiment of the disclosure.

In system 400, a user 405 can utilize an IMS process flow toolset 415 running on a client device 410 to create an IMS process flow application 445 that runs within the IMS 440. That is, user 405 and client device 410 can perform function in a development environment 402. Server 460 and IMS 440 can be components of a production environment 404.

The IMS 440 can represent a computing system that supports data management and transaction activities. As shown in system 400, the IMS 440 can also be configured to communicate over a network 470 with an IMS process flow toolset 415 running on a client device 410 as well as business process applications 465 running on servers 460. Communications between device 410 and IMS 440 can occur during a software development phase of a software lifecycle, such as occurring during software 445 deployment. Communications between IMS 440 and server 460 can occur (in real-time or near real time) dynamically when executing application 465 or 445 in production environment 404.

The IMS process flow toolset 415 can represent a software development tool that can be used to create and/or modify an IMS process flow application 445. As shown in system 400, the IMS process flow toolset 415 can include an IMS-specific source code editor 420 and an IMS process flow choreographer 425.

The IMS-specific source code editor 420 can represent a software development environment tool that supports a set of programming languages, such as COBOL and JAVA, used by the IMS 440, providing features and functionality tailored for the IMS 440 environment. Within the IMS-specific source code editor 420, the user 405 can create/view/modify the source code of the IMS process flow application 445. For example, the IMS-specific source code editor 420 can offer the user 405 features commonly found in integrated development environments (IDEs) such as keyword coloration and syntax checking in relation to IMS 440.

The IMS-specific source code editor 420 can also include additional features to assist in programming for IMS 440, such as the IMS call wizard 422. The IMS call wizard 422 can represent a graphical user interface (GUI) that can simplify creation of an IMS call for the user 405. For example, the IMS call wizard 422 can present the user 405 with allowable options for call parameters and automatically generate the underlying software code based on user selections.

In order to create an IMS process flow application 445, the user 405 can launch the IMS process flow choreographer 425 from within the IMS-specific source code editor 420. The IMS process flow choreographer 425 can represent the software component of the IMS process flow toolset 415 that allows the user 405 to visually design and define the process flow elements of the IMS process flow application 445.

For example, the IMS process flow choreographer 425 can allow the user 405 to add and connect graphical icons that represent the various service components, computations, business logic, data variables, and compensation activities of the business process being implemented. The service components expressed within the IMS process flow choreographer 425 can include components external to the IMS 440 such as business process applications 465 operating from other servers 460.

The graphical configuration of elements created by the user 405 within the IMS process flow choreographer 425 can be captured as an IMS process flow model 455. Since the graphical elements of the IMS process flow model 455 cannot be directly utilized by the IMS 440, the IMS control program generator 430 can be invoked from the IMS process flow choreographer 425 to generate an IMS process flow control program 450. The IMS process flow control program 450 can represent the underlying software code that corresponds to the graphical elements expressed within the IMS process flow model 455. For example, branching within the IMS process flow model 455 can be represented as a conditional control structure within the IMS process flow control program 450.

As shown in system 400, the IMS process flow control program 450 can be contained within the IMS process flow application 445. In an alternate embodiment, the IMS process flow control program 450 can exist separate from, but associated with the IMS process flow application 445. Thus, the IMS process flow application 445 can represent an IMS application that has been modified to accommodate process flow elements. The process flow elements of the IMS process flow application 445 can be defined within a corresponding IMS process flow model 455 and encoded within an IMS process flow control program 450.

As used herein, IMS 440 can be a collection of programs for storing, organizing, selecting, modifying, and extracting data from a database. IMS 440 stores data using a hierarchical model (as opposed, for example, to a relational database model). IMS 440 can include a transaction management subsystem (not shown), a database manager subsystem (not shown), and a systems services subsystem (not shown). The transaction manager subsystem can create, execute, and manage transaction processing applications. The transaction management subsystem can also performing network management, message management, data communication, and security functions for the IMS 440. Transaction processing applications utilize transactions, which include the request and execution of a set of programs, performing administrative functions, and accessing a shared database. The IMS process flow application 445 can be a transaction processing application, which utilizes (is executed by) the transaction manager subsystem of the IMS 440.

The database manager subsystem can be for querying and storing data in accordance with a hierarchical model and for performing data integrity and data recovery functions. The IMS process flow application 445 can be a database processing application, which utilizes (is executed by) the database manager subsystem of the IMS 440.

The systems services subsystem can be for managing memory of the IMS, for command processing, and for inter system communications. Interactions between business process applications 465 and IMS process flow application 445 can occur through the system services subsystem.

In one embodiment (e.g., an IBM IMS V9 based one), the transaction manager subsystem can be integrated with external applications, such as LOTUS, WEBSPHERE MQ, and DB2 stored procedures. In the same embodiment, the database manager subsystem can be integrated with XQUERY, DB2Stored Procedures, WEBSPHERE INFORMATION INTEGRATOR CLASSIC FEDERATION, WEBSPHERE IMS DB UTILITY, and Customer Information Control System (CICS). The system services subsystem can use a JAVA Integrated connect to interface with TCP/IP Clients, a SOAP gateway, WEBSPHERE APPLICATION SERVER, and WEBSPHERE/RATIONAL tools. In one embodiment, the IMS process flow toolset 415 can interface with the IMS 440 via the JAVA Integrated connected component of the system services subsystem of IMS 440.

In various implementations, the IMS 440 can be implemented as a full function database, a fast path database, and/or a high availability large database (HALDB). Full function IMS databases can have primary and secondary indexes, accessed using Data Language Interface (DL/I) calls from various application program, such as structure query language (SQL) calls to a relational database. Code for the DL/I calls can be automatically generated by the IMS call wizard 422. Full function databases can have a variety of access methods, such as Hierarchical Direct (HDAM), Hierarchical Indexed Direct (HIDAM), Simple Hierarchical Indexed Sequential (SHISAM), Hierarchical Sequential (HSAM), and Hierarchical Indexed Sequential (HISAM). In one embodiment, a full function database can store data using virtual storage access method (VSAM) or overflow sequential (OSAM).

Network 470 can include any hardware/software/and firmware necessary to convey data encoded within carrier waves. Data can be contained within analog or digital signals and conveyed though data or voice channels. Network 470 can include local components and data pathways necessary for communications to be exchanged among computing device components and between integrated device components and peripheral devices. Network 470 can also include network equipment, such as routers, data lines, hubs, and intermediary servers which together form a data network, such as the Internet. Network 470 can also include circuit-based communication components and mobile communication components, such as telephony switches, modems, cellular communication towers, and the like. Network 470 can include line based and/or wireless communication pathways.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for an information management system (IMS) callout wizard, which is visually implemented within a graphical user interface based on processor executed code stored in a tangible storage medium, said method comprising:

selecting within said graphical user interface IMS source code or a graphical object having corresponding IMS source code, where the IMS source code is to include a call out to an external application;

invoking an IMS call wizard, which graphically prompts a user to specify call-out specific conditions for the external application via an ordered series of presented screens, each presenting a user with at least one selectable option, wherein user-made selections from earlier presented ones of the screens change options presented in later ones of the presented screens;

generating IMS code to call out an external application in accordance with the user selections of the IMS call wizard, wherein the generating comprises using an IMS control program generator to generate an IMS process flow control program from IMS process flow elements and their connections as defined through an IMS process flow choreographer, wherein the IMS process flow program is a discrete component of the IMS process flow application, and wherein bindings between the IMS process flow application and service components executably coupled to the IMS process flow application are defined in the IMS process flow control program; and inserting the generated IMS code into the selected IMS source code, wherein after the insertion the IMS source code is operable to call out to the external application.

2. The method of claim 1, wherein the generated IMS code calls a Data Language Interface (DL/I) language interface that initiates functions specified within DL/I calls in accordance with IMS call wizard established selections.

3. The method of claim 1, wherein the sequence of presented screens of the IMS call wizard comprise:

a call type screen to specify an interface type and call type of the IMS call out;

a function screen presenting a set of functions available given the interface type and call type selected via the call type screen;

a request language structure screen for selecting a language structure to be used for a request message to the external application; and a response language structure screen for selecting language structure to be used for response messages received from the external application.

4. The method of claim 1, wherein one of said presented screens of the IMS call wizard prompts a user to select an interface type from a group consisting of an application interface block (AIB), a language independent interface, and a language specific interface.

5. The method of claim 1, wherein one of said presented screens of the IMS call wizard prompts a user to select a call type from a database management type and a transaction management type.

6. The method of claim 1, wherein one of said presented screens presents a user with a set of functions available for a call by function code and function description, wherein a user is permitted to select a function from the presented set to be used for the call out.

7. The method of claim 1, wherein one of said presented screens presents a user with a set of language structures that define request messages sent to the external application, said set of language structures comprising: IMS Call Request (ICAL-REQ) language structures.

8. The method of claim 1, wherein one of said presented screens presents a user with a set of language structures that define response messages sent from the external application, said response language structures comprising IMS Call Response (ICAL-RESP) language structures.

9. The method of claim 1, wherein said graphical user interface comprises a canvas, wherein said canvas is a canvas an integrated development environment (IDE) canvas of a software development tool operable to visually compose process flows for IMS process flow applications.

10. An information management system (IMS) toolset for developing IMS applications executable within an IMS environment, said IMS toolset comprising a computer program product stored in a non-transitory tangible storage medium able to be executed by a processor of computing equipment, said IMS toolset comprising:

an IMS call wizard comprising a graphical user interface that presents users with allowable options for call parameters and that generates source code based on the user selections;

an IMS process flow choreographer for visually designing and defining process flow elements of an IMS process flow application;

an IMS control program generator for generating an IMS process flow control program from the flow elements and their connections as defined through the IMS process flow choreographer, wherein the IMS process flow program is a discrete component of the IMS process flow application, wherein bindings between the IMS process flow application and service components executably coupled to the IMS process flow application are defined in the IMS process flow control program; and an IMS source code editor for creating, editing, and saving source code of the IMS process flow application, wherein the source code editor is able to at least view and edit code of the IMS process flow control program generated by the IMS control program generator and is able to at least create, edit, and view source code of the IMS application other than code defined within the discrete component that is the IMS process flow.

11. The toolset of claim 10, wherein the IMS call wizard comprises a user selectable option for call type, wherein call types comprise an IMS database management call type and an IMS transaction management call type.

12. The toolset of claim 10, wherein the IMS call wizard comprises a user selectable option for IMS call interface type, wherein call interface types comprise an application interface block (AIB), a language independent interface (CEE), and a language specific interface, and wherein when the language specific interface is selected a user selects form one of a plurality of different available languages.

13. The toolset of claim 10, wherein the IMS call wizard presents a set of user selectable transaction management functions for accessing primary and secondary indexes of an IMS database via Data Language Interface (DL/I) calls.

14. An information management system (IMS) comprising:

a processor coupled to a memory, the processor configured to execute instructions for providing:

an IMS call wizard comprising a plurality of sequenced screens presented via a graphical user interface, wherein said sequenced screens present users with allowable options for call parameters and for automatically generating source code for call outs to applications external to an IMS system from within the IMS system based on user selections made within the sequenced screens, wherein user-made selections made in earlier ones of the presented screens changes options presented in later ones of the presented screens;

a plurality of IMS process flow applications executable within the IMS, wherein each of the IMS process flow applications comprise an IMS process flow control program, wherein the IMS process flow program is a discrete component of the IMS process flow application, wherein bindings between the IMS process flow application and service components executably coupled to the IMS process flow application are defined in the IMS process flow control program, wherein the service components comprise one or more external service components that execute outside the IMS and that communicate to the IMS via a systems services subsystem for managing memory of the IMS, for command processing, or for inter-system communications.

15. The IMS system of claim 14, further comprising:

an IMS source code editor for creating, editing, and saving source code of an IMS application, wherein the source code editor is able to at least view and edit code of the IMS code generated by the IMS call wizard.

16. The IMS system of claim 14, wherein the IMS call wizard comprises a user selectable option for call type, wherein call types comprise an IMS database management call type and an IMS transaction management call type.

17. The IMS system of claim 14, wherein the IMS call wizard comprises a user selectable option for IMS call interface type, wherein call interface types comprise an application interface block (AIB), a language independent interface (CEE), and a language specific interface, and wherein when the language specific interface is selected a user selects from one of a plurality of different available languages.

18. The IMS system of claim 14, wherein the sequenced screens of the IMS call wizard comprise:

a call type screen to specify an interface type and call type of the IMS call out;

a function screen presenting a set of functions available given the interface type and call type selected via the call type screen;

a request language structure screen for selecting a language structure to be used for a request message to the external application; and a response language structure screen for selecting language structure to be used for response messages received from the external application.

19. The IMS system of claim 14, further comprising:

a transaction management subsystem for creating, executing, and managing transaction processing applications and for performing network management, message management, data communication, and security functions for the IMS;

a database manager subsystem for querying and storing data in accordance with a hierarchical model and for performing data integrity and data recovery functions;

wherein each of the transaction management subsystem, the database manager subsystem, and the systems services subsystem comprise at least one computer program product stored in a tangible storage medium able to be executed by the processor.

\* \* \* \* \*